Aug. 3, 1943.   T. L. GATS   2,325,601
CAN-OPENING KEY
Filed Aug. 23, 1939

INVENTOR.
Thomas L. Gats,
BY
Richard Spencer
ATTORNEY.

Patented Aug. 3, 1943

2,325,601

UNITED STATES PATENT OFFICE 2,325,601

CAN-OPENING KEY

Thomas L. Gats, Villa Park, Ill., assignor of one-half to Wilfred S. Stone, Glen Ellyn, Ill.

Application August 23, 1939, Serial No. 291,465

3 Claims. (Cl. 220—52)

This invention relates to improvements in can-opening keys, and more particularly has to do with a can-opening key made of a metal which will crystallize under the heat of welding, and thereby become weakened so that it may be readily broken off from the can cover.

The requirements that a can-opening key when mounted on a can must meet are two in number: firstly, the key must be held to the can with sufficient firmness that accidental blows during packing and shipping will not loosen the key from the can, and secondly, some means must be provided whereby the user may detach the key from the can without undue effort and with no implements other than his fingers.

At the present time the art and practice meet these two requirements in two ways. The older practice is to affix the key to some portion of the can, as the top, by means of solder. While the solder joint has sufficient strength to hold the key against the minor blows of packing and handling, but not sufficient strength to prevent comparatively easy removal by a user, it is undesirable in that the solder and necessary flux constitute a comparatively costly manufacturing step, and the flux sometimes eats away the tin coating leaving a corrosive metal exposed to rust. The second practice of affixing a can-opening key is that employing a weld. Originally this process was deemed impractical because the weld between the key and the can is stronger than the strength of the can metal with the result that the key can only be removed from the can by tearing a small hole therein. This practice was subsequently modified by cutting a slot in the shank of the key at a point adjacent to the weld. This slot weakened the shank of the key so that a user can easily break off the key along the slot, but before breaking, there is sufficient strength to hold the key to the can against minor blows.

The principal object of this invention is to provide a new and improved can-opening key which may be attached to the can by welding, thereby competing in cost with the welding practice, and yet meeting the two requirements which these keys when attached to the can must meet. The principal feature of this invention is the utilization for the can-opening keys of a metal which will crystallize under welding temperatures and thereby become sufficiently weak at the welding point to be readily removed from the can by the user. This invention constitutes a departure from existing practice in that the material of which the key is formed becomes of prime importance. It may be said here that existing keys are made of a basic steel or some other steel of low sulphur content. Spring steel is not used because that steel cannot be used in welding.

The steel that is used in this invention is known in the trade as "screw stock" and has a comparatively high sulphur content. This stock possesses average steel strength, that is, sufficient for the eyelet of the key when it is used in wrapping up the tongue on the can. On the other hand, the moment this stock is subjected to welding heats, its grain structure and the relationship of the molecules within the steel is altered by a process commonly called crystallization which materially weakens the stock. In considering this invention, it should be borne in mind that the point of the key which is welded to the can must be weak, but the eyelet of the key immediately next to that welded point, must remain strong. In making a fast or almost instantaneous weld, the crystallization of this screw stock steel is limited only to the point of welding.

A drawing has been added for the principal purpose of showing the place where the welded portion of the key breaks off. In the drawing.

The conception of this invention turns on the utilization of a material for a can-opening key which material will crystallize and become weak under welding temperatures. As is well known in the metallurgical art, sulphur and phosphorous are generally considered impurities which weaken the steel. On the other hand, there are uses for steel which call for a less tough material, as machining it, and it is, therefore, general practice to use a Bessemer process steel which retains substantial quantities of sulphur found in the ore.

Heretofore, manufacturers have been using a low sulphur steel for can-opening keys which upon welding do not lose their chemical structure due to exceeding their fusion temperature, but upon cooling, retain their strength. When a key made of this steel is welded to a can top, the strength of either the shank of the key or the weld exceeds that of the can material which in itself is quite strong with the result that the key can only be removed by tearing a hole in the can at the point of the weld.

The addition of sulphur to the steel, as is well known, materially alters the characteristics of the steel. These high sulphur steels, commonly referred to as "screw stock" and officially identified as S. A. E. 1112 having a melting or fusion point of 2,000° to 2,200° F. is used for screw machine work, because the tool may more easily cold cut it. When this metal is fused as by spot welding with an electric welding machine, it is believed that the sulphur coagulates or causes some other rearrangement of the metallic stock, so that the steel which has passed the melting point and then cooled becomes very weak.

Figure 1:
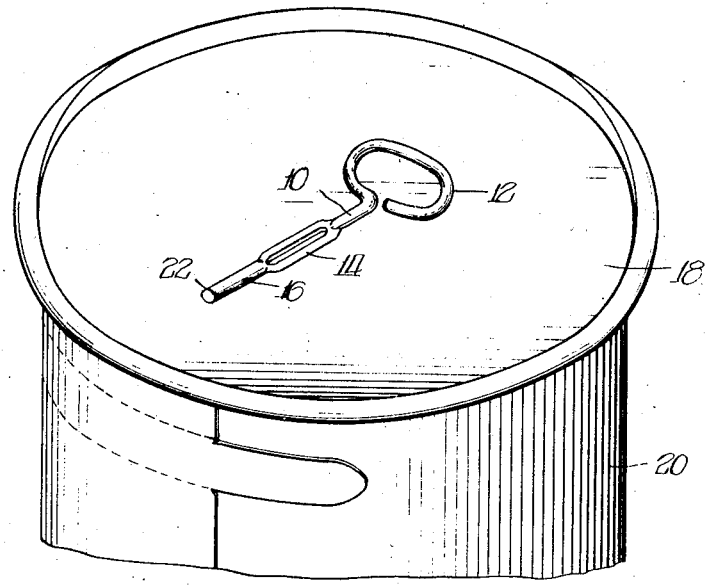
Figure 1 illustrates a key affixed to the top of a conventional vacuum-packed coffee can.
Figure 2:
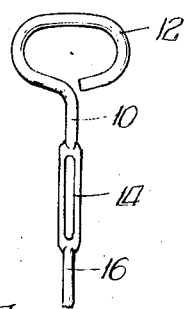
Figure 2 is a view of a key prior to welding.
Figure 3:
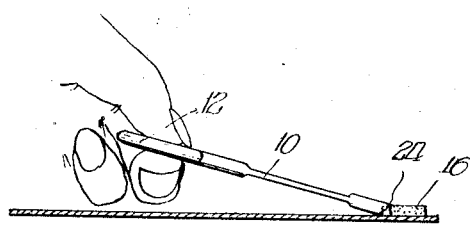
Figure 3 shows the key breaking at the edge of the crystallized portion of the stock.

With the above in mind and referring to the drawing, the key 10 having a finger grip 12 and eyelet 14 and a welding tip 16 is formed of screw stock and is fastened to a can, as for example, the lid 18 of a conventional vacuum-packed coffee can 20 by a spot weld at the point 22, which is the end of the welding tip 16. This weld may be made by even the smallest of welding machines as the 7 kilowatt machine which delivers 150 amperes at 2 volts to the point of welding. By this welding operation, the key 10 is weakened only at the point of the weld and as may be seen in Figure 3, the key may be lifted from the can top and it will break clear at some point, such as 24.

Figure 4:
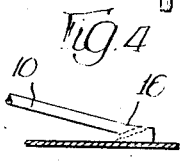
Figure 4 shows the key breaking diagonally across the crystallized portion of the stock.

That the key becomes weak only at the point of fusion is established by other breaking off experiments, one such being shown in Figure 4. In this figure, the welded part 16 of the key 10 is breaking along a diagonal, and the conclusion is drawn that the way in which the fused part of the key breaks, depends upon the two factors of the distribution of sulphur in the metal and the condition and shape of the electrode that made the weld. Suffice it to say, that the key will break from the can top at some line running through the fusion area.

As for the range of steels that may be used for this key, perhaps the best definition for the purposes of this invention is to describe them either as a metal which may be substantially weakened by heating it to its fusion point and then cooling, or more narrowly as a comparatively high sulphur steel stock. In support of the latter definition, it should be borne in mind that screw stock is commonly derived from steel produced by the Bessemer process. This process does not remove the phosphorous and sulphur to that degree obtained by utilizing the open-hearth process. The product of the open-hearth process is generally referred to as "basic steel" which is characterized by a low phosphorous and sulphur content. Moreover, the basic steels are much tougher than the Bessemer steels and may be raised to the fusion point and then cooled without noticeably altering their strength characteristics. As mentioned above, this does not seem to be true of the high sulphur stock which becomes noticeably weaker at any point of fusion.

The screw stock wire possesses qualities which enable it to be shaped into the key form with the eyelet stamped in it. The keys are affixed to the can tops by a simple welding machine. The process is simple, not being affected by the use of hot solder or acid flux, and dispenses with one step in the making of the key where the welding process is used, namely, the grooving or provision of a thin portion. Also, there is no occasion for flattening the end of the key in order to form a weld.

Having thus described my invention, what I claim as new and desire to secure by Letters Patent of the United States is:

1. The combination of a can having a tear strip and for use with said tear strip a key of high sulphur steel having a limited portion thereof fused to the can, said fused limited portion of the key being formed of a material substantially weaker than the material of the can to which said limited portion is fused and substantially weaker than the material of the balance of the key, whereby forceable separation of the key and the can will cause a breaking in said limited portion.

2. The combination of a can and a key made of high sulphur steel having a limited portion thereof fused to the can, said limited portion of the key being formed as a result of said fusion of a crystalline structure of comparatively high frangibility compared to the structure of the balance of the key and to the structure of the can top to which it is fused, whereby forceable separation of the key from the can will cause a break in the limited portion of the key to occur.

3. The combination of a can and a key made of S. A. E. 1112 steel having a limited portion thereof fused to the can, said limited portion of the key being formed as a result of said fusion of a crystalline structure of comparatively high frangibility compared to the structure of the balance of the key and to the structure of the can top to which it is fused, whereby forceable separation of the key from the can will cause a break in the limited portion of the key to occur.

THOMAS L. GATS.